United States Patent
Zhou (10) Patent No.: US 9,939,960 B2
(45) Date of Patent: Apr. 10, 2018

(54) PHOTOSENSITIVE STRUCTURE, PHOTOSENSITIVE DISPLAY SUBSTRATE, AND FABRICATION AND CONTROL METHODS OF THE PHOTOSENSITIVE DISPLAY SUBSTRATE

(71) Applicant: BOE TECHNOLOGY GROUP CO., LTD, Beijing (CN)

(72) Inventor: Xiaodong Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/031,004

(22) PCT Filed: Aug. 14, 2015

(86) PCT No.: PCT/CN2015/086946
§ 371 (c)(1),
(2) Date: Apr. 21, 2016

(87) PCT Pub. No.: WO2016/101630
PCT Pub. Date: Jun. 30, 2016

(65) Prior Publication Data
US 2016/0334899 A1 Nov. 17, 2016

(30) Foreign Application Priority Data
Dec. 26, 2014 (CN) .......................... 2014 1 0833903

(51) Int. Cl.
*G06F 3/042* (2006.01)
*G06F 3/041* (2006.01)
(Continued)

(52) U.S. Cl.
CPC .............. *G06F 3/042* (2013.01); *G02F 1/135* (2013.01); *G02F 1/13338* (2013.01)

(58) Field of Classification Search
CPC ....................................................... G06F 3/044
See application file for complete search history.

(56) References Cited

U.S. PATENT DOCUMENTS

2003/0067447 A1* 4/2003 Geaghan ............... G06F 3/0416
345/173
2006/0227114 A1* 10/2006 Geaghan ............... G06F 3/0418
345/173

(Continued)

FOREIGN PATENT DOCUMENTS

CN 101989151 A * 3/2011
CN 102043538 A 5/2011
(Continued)

OTHER PUBLICATIONS

The World Intellectual Property Organization (WIPO) International Search Report for PCT/CN2015/086946 dated Nov. 24, 2015.

*Primary Examiner* — Nan-Ying Yang
(74) *Attorney, Agent, or Firm* — Anova Law Group, PLLC (57) ABSTRACT

The present disclosure provides a photosensitive structure, a photosensitive display substrate, and fabrication and control methods of the photosensitive display substrate. The photosensitive structure includes a first conductive layer; a second conductive layer; and a photoconductive material layer, sandwiched there-between. In response to a light illumination, the photoconductive material layer is capable of changing from an insulating state to a conductive state. One or more first constant voltage sources are configured in a periphery of the first conductive layer to charge the first conductive layer in different directions to maintain a first voltage there-on. Each current measurement unit is disposed between one first constant voltage source and the first conductive layer and configured to measure a charging current between the first constant voltage source and the first (Continued)

conductive layer, and configured to output current signals corresponding to the first constant voltage sources. A touch signal determination unit is connected to the current measurement units to determine a touch position.

19 Claims, 5 Drawing Sheets

(51) Int. Cl.
*G02F 1/1333* (2006.01)
*G02F 1/135* (2006.01)

(56) References Cited

U.S. PATENT DOCUMENTS

| | | | | |
|---|---|---|---|---|
| 2009/0246704 | A1* | 10/2009 | Chou | G03F 7/2032 |
| | | | | 430/312 |
| 2014/0368758 | A1* | 12/2014 | Liu | G06F 3/0412 |
| | | | | 349/12 |
| 2015/0109246 | A1* | 4/2015 | Lee | G06F 3/045 |
| | | | | 345/174 |

FOREIGN PATENT DOCUMENTS

| | | |
|---|---|---|
| CN | 202306503 U | 7/2012 |
| CN | 102945075 A | 2/2013 |
| CN | 103345338 A | 10/2013 |
| CN | 104461178 A | 3/2015 |
| CN | 204288180 U | 4/2015 |
| JP | H0619608 A | 1/1994 |

* cited by examiner

PHOTOSENSITIVE STRUCTURE, PHOTOSENSITIVE DISPLAY SUBSTRATE, AND FABRICATION AND CONTROL METHODS OF THE PHOTOSENSITIVE DISPLAY SUBSTRATE

CROSS-REFERENCES TO RELATED APPLICATIONS

This application is a national phase entry under 35 U.S.C. § 371 of International Application No. PCT/CN2015/086946, filed on Aug. 14, 2015, which claims priority to Chinese Patent Application No. CN201410833903.8, filed on Dec. 26, 2014. The above enumerated patent applications are incorporated by reference herein in their entirety.

FIELD OF THE DISCLOSURE

The present disclosure generally relates to the field of touch display technologies and, more particularly, relates to a photosensitive structure, a photosensitive display substrate, and fabrication and control methods of the photosensitive display substrate.

BACKGROUND

As the information technology advances, the touch screen technology has been progressed from low end to high end products. Based on the operation mode, the touch screen technology is divided into four categories, including resistive touch screen, capacitive touch screen, infrared touch screen and surface acoustic wave touch screen.

However, all four categories of touch screens require a corresponding touch control object (e.g., a finger or stylus) to physically contact the touch screen. In doing this, the user must be positioned in close proximity with the touch screen. However, due to the physical contact of the touch control object on the touch screen, surface wear and tear of the touch screen may occur.

The disclosed photosensitive structure and photosensitive display substrate are directed to at least partially alleviate one or more problems set forth above and other problems in the art.

BRIEF SUMMARY OF THE DISCLOSURE

One aspect of the present disclosure provides a photosensitive structure. The photosensitive structure includes a first conductive layer; a second conductive layer; and a photoconductive material layer, sandwiched between the first conductive layer and the second conductive layer. In response to a light illumination, the photoconductive material layer is capable of changing from an insulating state to a conductive state. The photosensitive structure also includes one or more first constant voltage sources, configured in a periphery of the first conductive layer to charge the first conductive layer in a plurality of different directions to maintain a first voltage on the first conductive layer. A plurality of current measurement units is each disposed between one first constant voltage source and the first conductive layer and each configured to measure a charging current between the first constant voltage source and the first conductive layer. The plurality of current measurement units are configured to output a plurality of current signals corresponding to the one or more first constant voltage sources. A touch signal determination unit is connected to the plurality of current measurement units to determine a touch position based on the plurality of current signals from the plurality of current measurement units.

Optionally, the one or more first constant voltage sources are connected to the first conductive layer at different locations of the first conductive layer to supply voltage to the first conductive layer via the different locations.

Optionally, the first conductive layer has a polygonal shape, and the different locations of the first conductive layer include different sides and vertexes of the first conductive layer.

Optionally, the first conductive layer has a circular shape, and the different locations of the first conductive layer include different location points that are symmetrically-configured or evenly-distributed on the first conductive layer.

Optionally, the first conductive layer is a rectangular conductive layer.

Optionally, the one or more first constant voltage sources are configured to apply a same voltage to four corners of the rectangular conductive layer.

Optionally, at least three first constant voltage sources are configured to apply a voltage to four corners of the rectangular conductive layer.

Optionally, the plurality of the current measurement units include four current measurement units, each connected to one of four corners of the rectangular conductive layer.

Optionally, one first constant voltage source is configured and connected to the plurality of current measurement units.

Optionally, the photoconductive material layer is sheet-shaped or mesh-shaped.

When the first conductive layer has a rectangular shape having four corners A, B, C and D connected to four current measurement units to respectively measure the charging current at each corner denoted as i_A, i_B, i_C and i_D, a position of a touch point on the first conductive layer is determined by:

$$\frac{L1}{L2} \text{ and } \frac{L3}{L4}.$$

$$\frac{L1}{L2} = \frac{i\_A}{i\_D} = \frac{i\_B}{i\_C},$$

and $$\frac{L3}{L4} = \frac{i\_D}{i\_C} = \frac{i\_A}{i\_B}.$$

L1 is a distance between corner A or B and the touch point in a length direction of the rectangular shape, L2 is a distance between corner C or D and the touch point in a length direction of the rectangular shape, L3 is a distance between corner A or D and the touch point in a width direction of the rectangular shape, and L4 is a distance between corner B or C and the touch point in a width direction of the rectangular shape.

Optionally, at least one of the first conductive layer and the second conductive layer is made of a transparent conductive material.

Optionally, the transparent conductive material is indium tin oxide (ITO).

Optionally, the photoconductive material layer is made of one or more of an inorganic material and an organic material, the inorganic material includes selenium, selenium tellurium alloy, cadmium sulfide, zinc oxide, or a combination thereof, and the organic material includes polyvinyl carbazole, phthalocyanine complex, azo compound, squire morpholine compound, or a combination thereof.

Optionally, a plurality of second constant voltage sources, connected to the second conductive layer to provide the second voltage different than the first voltage.

Optionally, the second conductive layer is connected to ground.

Another aspect of the present disclosure provides a photosensitive display substrate including a display substrate and the disclosed photosensitive structure. The display substrate includes a base substrate, a color filter layer, and a light-shielding layer. The photosensitive structure, the color filter layer, and the light-shielding layer, are disposed over a same side of the base substrate. The second conductive layer is formed over the base substrate. The photoconductive material layer is formed over the second conductive layer. The photoconductive material layer includes meshes formed by a first plurality of photoconductive material lines and a second plurality of photoconductive material lines that are crossly configured, each mesh corresponding to a pixel cell. The color filter layer is formed in the pixel cells. The first conductive layer is formed over the color filter layer and over the photoconductive material layer. The light-shielding layer is formed over the first conductive layer and configured to provide a projected area covering the first and second plurality of photoconductive material lines of the photoconductive material layer in a direction perpendicular to a surface of the base substrate.

Optionally, the second conductive layer includes meshes corresponding to the meshes in the photoconductive material layer.

Optionally, the light-shielding layer includes meshes corresponding to the meshes in the photoconductive material layer.

Optionally, a photosensitive display device is provided to include the disclosed photosensitive display substrate.

Another aspect of the present disclosure provides a method of fabricating a photosensitive display substrate by forming a first conductive layer over a base substrate, and forming a photoconductive material layer over the first conductive layer, the photoconductive material layer including meshes formed by a first plurality of photoconductive material lines and a second plurality of photoconductive material lines that are crossly configured, each mesh corresponding to a pixel cell. A color filter layer is formed in the pixel cells. A second conductive layer is formed over the color filter layer and over the photoconductive material layer. A light-shielding layer is formed over the second conductive layer to provide a projected area covering the first and second plurality of photoconductive material lines of the photoconductive material layer in a direction perpendicular to a surface of the base substrate.

Optionally, the color filter layer has a surface higher than a surface of the photoconductive material layer, the second conductive layer is conformally formed over the color filter layer and over the photoconductive material layer, and a portion of the light-shielding layer is extended into a surface of the first conductive layer.

Optionally, the first conductive layer is formed having meshes corresponding to the meshes in the photoconductive material layer, the first conductive layer and the photoconductive material layer are formed in a single patterning process, and the light-shielding layer is formed having meshes corresponding to the meshes in the photoconductive material layer.

Another aspect of the present disclosure provides a control method in a photosensitive display device by providing the photosensitive structure including a first conductive layer, a second conductive layer, and a photoconductive material layer sandwiched by the first conductive layer and the second conductive layer. One or more first constant voltage sources are configured in the periphery of the first conductive layer to supply power, and to charge the first conductive layer in a plurality of different directions to maintain a first voltage on the first conductive layer.

A light illumination is received to pass through one of the first and second conductive layers to have a light illuminated area in the photoconductive material layer. A charging current between the first conductive layer and each of the more or more first constant voltage sources is measured in response to the light illumination, by a plurality of current measurement units, to output a plurality of current signals corresponding to the one or more first constant voltage sources. A touch position is determined by a touch signal determination unit connected to the plurality of current measurement units, based over the plurality of current signals.

Optionally, a second voltage is applied to the second conductive layer by a plurality of second constant voltage sources, the second voltage being different than the first voltage, or the second conductive layer is connected to ground.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

The present disclosure provides a photosensitive structure, a photosensitive display substrate, and fabrication and control methods of the photosensitive display substrate.

For example, from a distance, a user may provide a light illumination (e.g., by pointing a light beam with sufficient brightness to a photosensitive display screen) on the photosensitive display screen to remotely perform a photosensitive (or light touch) control function. Thus, no physical contact is performed to the photosensitive display screen by a touch control object. Surface wear and tear of the touch screen of the photosensitive display device can be avoided.

First Exemplary Embodiment

Figure 1:
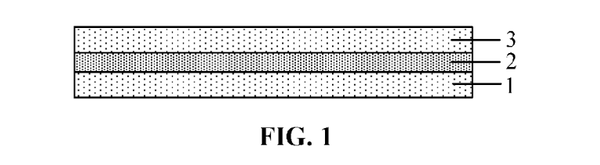
FIG. 1 illustrates a cross-sectional view of an exemplary photosensitive structure according to a first exemplary embodiment of the present disclosure.
Figure 2:
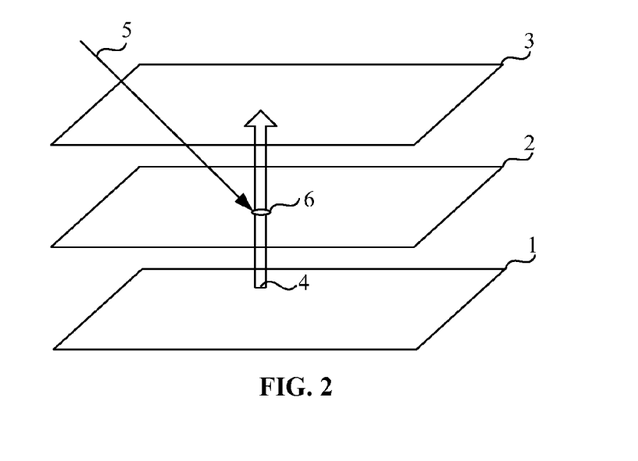
FIG. 2 illustrates an operation principle of an exemplary photosensitive structure according to the first exemplary embodiment of the present disclosure.
Figure 3A:
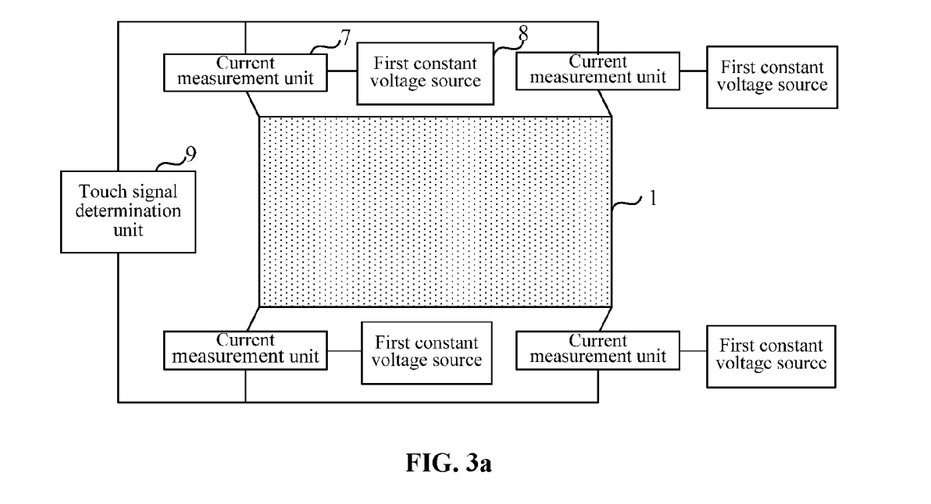
FIG. 3a illustrates a schematic view of an exemplary photosensitive structure according to the first exemplary embodiment of the present disclosure.

FIG. 1 illustrates a cross-sectional view of an exemplary photosensitive structure according to a first exemplary embodiment of the present disclosure. FIG. 2 illustrates an operation principle of an exemplary photosensitive structure according to the first exemplary embodiment of the present disclosure. FIG. 3a illustrates a schematic view of a first conductive layer, four current measurement units, four first constant voltage sources, and a touch signal determination unit in an exemplary photosensitive structure according to the first exemplary embodiment of the present disclosure.

As shown in FIGS. 1, 2, and 3a, the exemplary photosensitive structure includes a first conductive layer 1, a second conductive layer 3 and a photoconductive material layer 2. The first conductive layer 1 and the second conductive layer 3 are configured on opposite sides of the photoconductive material layer 2. The photoconductive material layer 2 is sandwiched between the first conductive layer 1 and the second conductive layer 3.

One or more first constant voltage sources 8 are configured in the periphery of the first conductive layer 1. The voltage on the first conductive layer 1 is different from, e.g., greater than or less than, the voltage on the second conductive layer 3. In one embodiment, a current measurement unit 7 is configured between each first constant voltage source 8 and the first conductive layer 1.

Although not shown in FIG. 3a, various other configurations of the current measurement units and the first constant voltage source(s) can be encompassed in the present disclosure. For example, the first constant voltage source(s) may apply a same voltage to four corners of a rectangular first conductive layer. Alternatively, at least three first constant voltage sources are configured to apply a voltage to four corners of the rectangular first conductive layer. Alternatively, the plurality of the current measurement units includes four current measurement units, each connected to one of four corners of the first conductive layer. Alternatively, one first constant voltage source is configured and connected to the plurality of current measurement units.

The current measurement units 7 are further connected to a touch signal determination unit 9.

In various embodiments, the first constant voltage source is a non-zero constant voltage source. The one or more constant voltage sources may include a plurality of the non-zero constant voltage sources.

In one embodiment, when a light beam 5 with certain brightness (depending on the material of the photoconductive material layer 2) illuminates the photoconductive material layer 2, the light illuminated area 6 on/in the photoconductive material layer 2 turns from an insulating state to a conductive state. The electric charges such as positive electric charges on the first conductive layer 1 migrate to the second conductive layer 3 through the light illuminated area 6 in the photoconductive material layer 2. The first constant voltage sources 8 supplies power from different directions to recharge the first conductive layer 1 to maintain a constant voltage at the first conductive layer 1. The current measurement unit 7 measures the charging current between the first constant voltage source 8 and the first conductive layer 1 to output the corresponding current signal. The touch signal determination unit 9 calculates the touch position based on the charging current measurements from different directions. Thus, the light touch control function is realized to determine the touch position in response to the light illumination.

In one embodiment, supplying power by the one or more first constant voltage sources 8 to the first conductive layer 1 from different directions means that non-zero constant voltage source(s) are connected to different locations of the first conductive layer 1 and are configured to supply power to the first conductive layer 1, for example, at each and every connection locations at the same time.

Figure 3B:
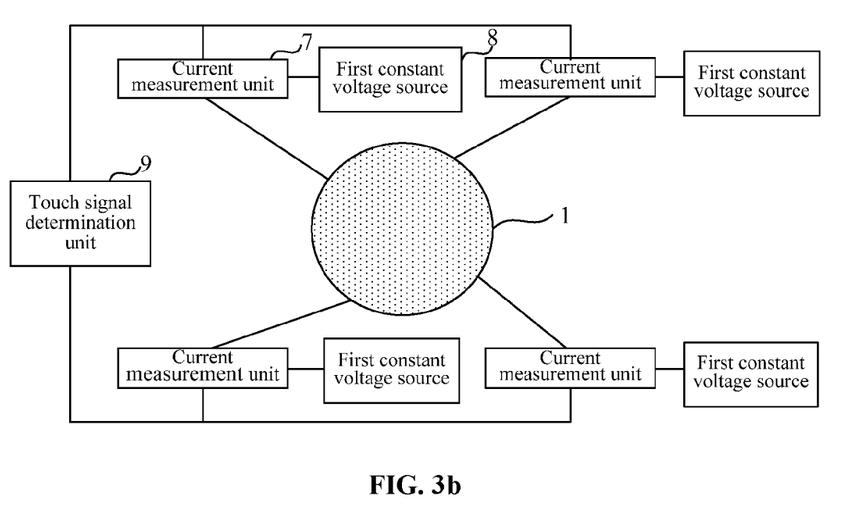
FIG. 3b illustrates a schematic view of another exemplary photosensitive structure according to the present disclosure.

The different locations on the first conductive layer 1 for connecting to the first constant voltage sources 8 may include, for example, different locations on sides and/or vertexes of a first conductive layer 1 having a polygonal shape, e.g., as schematically shown in FIG. 3a, or different location points that are symmetrically-configured or evenly-distributed on a circular shaped first conductive layer 1, e.g., as schematically shown in FIG. 3b.

Figure 3C:
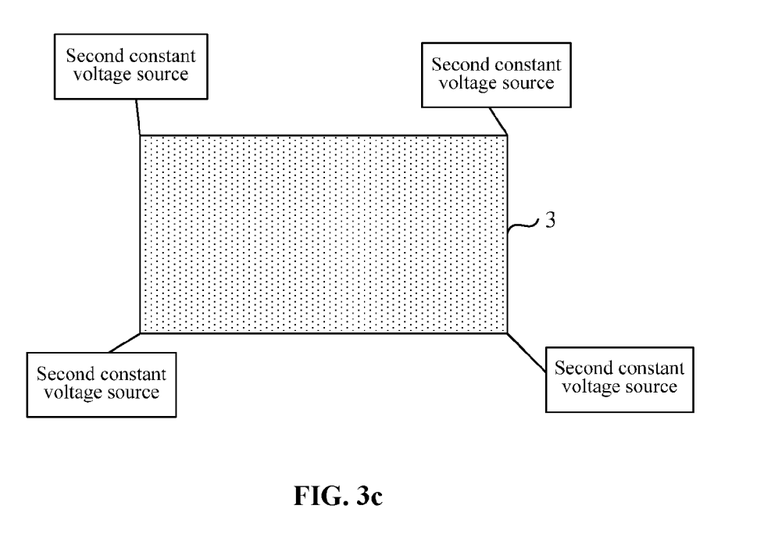
FIG. 3c illustrates a schematic view of another exemplary photosensitive structure according to the present disclosure.

In one embodiment, to assure the voltage on the first conductive layer 1 is greater than the voltage on the second conductive layer 3, a plurality of second constant voltage sources, such as non-zero constant voltage sources, may be connected to the second conductive layer 3, e.g., as schematically shown in FIG. 3c. The second non-zero constant voltage source has a voltage lower than the voltage of the first constant voltage source 8. Alternatively, the second conductive layer 3 may be connected to ground to save the cost due to use of the plurality of the second non-zero constant voltage sources.

Note that the photoconductive material layer 2 may be made of inorganic materials, such as selenium, selenium tellurium alloy, cadmium sulfide and/or zinc oxide. Alternatively, the photoconductive material layer may be made of organic materials, such as polyvinyl carbazole, phthalocyanine complex, azo compound, and/or squire morpholine compound.

In one embodiment, any number (≥3) of current measurement units 7 may be included. For example, as shown in FIG. 3a, four current measurement units 7 are connected to the four corners of the first conductive layer 1 respectively. In addition, a same number of the first constant voltage sources 8 may be included. Four first constant voltage sources 8 are connected to four current measurement units 7 respectively. Alternatively, only one first constant voltage source 8 may be configured. Then four current measurement units 7 may be connected to that one first constant voltage source 8. The present disclosure does not limit the number of the first constant voltage sources, as long as the voltages at four corners of the first conductive layer 1 are the same.

When no light beam 5 or a low brightness light beam 5 illuminates the photoconductive material layer 2, the entire photoconductive material layer 2 is in an insulating state. The first conductive layer 1 and the second conductive layer 3 are insulated from each other.

When a light beam 5 with sufficient brightness illuminates the photoconductive material layer 2, the light illuminated area 6 on the photoconductive material layer 2 turns from an insulating state to a conductive state. The first conductive layer 1 and the second conductive layer 3 are electrically connected to each other through the light illuminated area 6.

The positive electric charges on the first conductive layer 1 migrate to the second conductive layer 3 through the light illuminated area 6 to produce a current flowing from the first conductive layer 1 to the second conductive layer 3 (e.g., as indicated by the arrow 4 in FIG. 2). Because the first conductive layer 1 is losing the positive electric charges, the first constant voltage sources 8 are triggered to recharge the first conductive layer 1 from the four corners of the first conductive layer 1 to restore the constant voltage of the first conductive layer 1. During the charging process, the exemplary four current measurement units 7 measure the charging currents at the four corners corresponding to the four first constant voltage sources 8. The measurements of the four charging currents are sent to the touch signal determination unit 9.

In addition, any three of the four measurements of charging current at four corners are used to calculate the position of the light illuminated area 6 (i.e., the touch position) by the touch signal determination unit 9. The process of calculating the touch position by using any three current measurements from the four current measurement units is described in detail below with the accompanying drawings.

Figure 4:
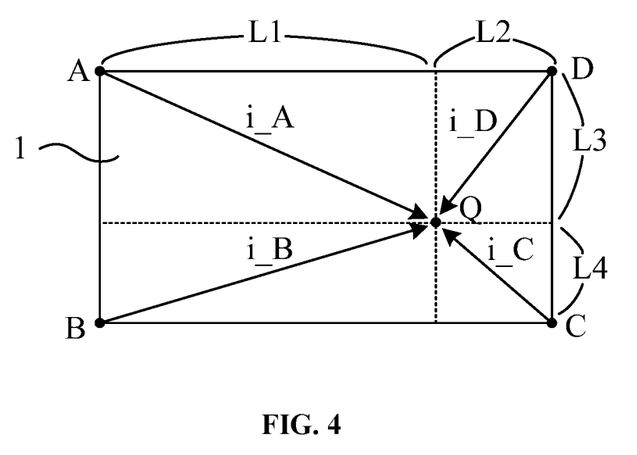
FIG. 4 illustrates touch position calculation of the touch signal determination unit according to the first exemplary embodiment of the present disclosure.

FIG. 4 illustrates touch position calculation of the touch signal determination unit according to the first exemplary embodiment of the present disclosure. As shown in FIG. 4, the four corners of the first conductive layer 1, e.g., having a rectangular shape, are denoted as A, B, C and D. The touch position is denoted as Q. The distances from point Q to sides AB, BC, CD and DA are denoted as L1, L2, L3 and L4. For example, L1 is a distance between corner A or B and the touch point in a length direction of the rectangular shape, L2 is a distance between corner C or D and the touch point in a length direction of the rectangular shape, L3 is a distance between corner A or D and the touch point in a width direction of the rectangular shape, and L4 is a distance between corner B or C and the touch point in a width direction of the rectangular shape.

When the first constant voltage sources 8 supply power to the first conductive layer 1 from the four corners, four currents from each of the four corners A, B, C and D to the point Q are generated and measured by the four current measurement units 7 connected to the four corners. In one embodiment, the four currents flowing through the four corners A, B, C and D are denoted as i_A, i_B, i_C and i_D. The relationship between the four currents i_A, i_B, i_C and i_D and the four distances L1, L2, L3 and L4 can be expressed as follows.

$$\frac{L1}{L2} = \frac{i\_A}{i\_D} = \frac{i\_B}{i\_C}$$

$$\frac{L3}{L4} = \frac{i\_D}{i\_C} = \frac{i\_A}{i\_B}$$

Therefore, when any three of i_A, i_B, i_C and i_D are known, $$\frac{L1}{L2} \text{ and } \frac{L3}{L4}$$

can be solved. The coordinate of point Q on the first conductive layer 1 can be calculated from $$\frac{L1}{L2} \text{ and } \frac{L3}{L4}.$$

Thus, the touch position is determined and the light touch control is realized.

Note that only three current measurement units 7 are needed when the first conductive layer 1 is in a rectangular shape. The purpose of configuring four current measurement units 7 at the four corners of the first conductive layer 1 is to select different sets of three current measurements to calculate different coordinates of the touch position to generate a more reliable coordinate of the touch position, for example, by averaging the coordinates calculated differently.

In one embodiment, at least one of the first conductive layer 1 and the second conductive layer 3 is made of a transparent material to allow light beam 5 to pass therethrough and to hit the photoconductive material layer 2. Optionally, the transparent material may be indium tin oxide (ITO).

The present disclosure provides a photosensitive structure. The photosensitive structure includes a first conductive layer, a second conductive layer and a photoconductive material layer. The first conductive layer and the second conductive layer are configured on opposite sides of a photoconductive material layer. The photoconductive material layer is sandwiched between the first conductive layer and the second conductive layer. A plurality of first constant voltage sources is configured in the periphery of the first conductive layer. The voltage on the first conductive layer is higher than the voltage on the second conductive layer. A current measurement unit is configured between each of the first constant voltage sources and the first conductive layer. The plurality of the current measurement units are connected to the touch signal determination unit.

In one embodiment, when a light beam with sufficient brightness illuminates the photoconductive material layer, the light illuminated area on the photoconductive material layer turns from an insulating state to a conductive state. Positive electric charges on the first conductive layer may migrate to the second conductive layer through the conductive light illuminated area. The first constant voltage sources are triggered to supply power to the first conductive layer to recharge the first conductive layer. The current measurement units measure the currents flowing from the first constant voltage sources to the first conductive layer respectively. The touch signal determination unit calculates the touch position based on the current measurements obtained from the current measurement units. Thus, the light touch control is realized.

Second Exemplary Embodiment

The second exemplary embodiment provides a photosensitive display substrate. The photosensitive display substrate includes a display substrate and a photosensitive structure. The photosensitive structure is configured over the display substrate.

In one embodiment, the display substrate is a color filter substrate. The color filter substrate includes a base substrate, a color filter layer and a light-shielding layer. The photosensitive structure, the color filter layer, and the light-shielding layer are configured at the same side of the base substrate.

Figure 5:
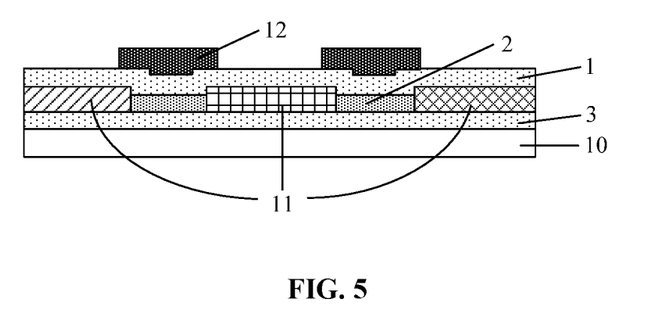
FIG. 5 illustrates a cross-sectional view of an exemplary photosensitive display substrate according to a second exemplary embodiment of the present disclosure.
Figure 6:
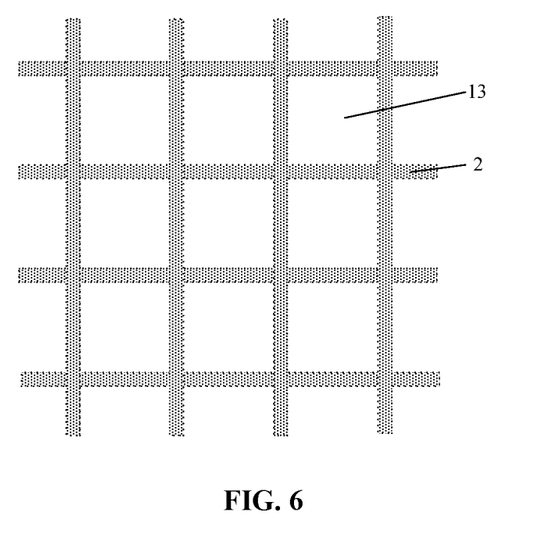
FIG. 6 illustrates a top view of a photoconductive material layer according to the second exemplary embodiment of the present disclosure.

For example, FIG. 5 illustrates a cross-sectional view of an exemplary photosensitive display substrate according to a second exemplary embodiment of the present disclosure. FIG. 6 illustrates a top view of a photoconductive material layer according to the second exemplary embodiment of the present disclosure.

As shown in FIGS. 5-6, the second conductive layer 3 is formed over a base substrate 10. The photoconductive material layer 2 is formed over the second conductive layer 3. In one embodiment, the photoconductive material layer 2 is mesh-shaped. The mesh-shaped photoconductive material layer defines a plurality of pixel cells. A color filter layer 11 is formed in the pixel cells 13. The first conductive layer 1 of the photosensitive structure is formed over the color filter layer 11 and the photoconductive material layer 2. A light-shielding layer 12 is formed over the first conductive layer 1. The light-shielding layer 12, or a projection thereof, in a direction perpendicular to a top surface of the base substrate 10 provides a projected area to cover the photoconductive material layer 2, as shown in FIG. 5.

The photosensitive display substrate as shown in FIG. 5 is configured in the photosensitive display device. The photoconductive material layer 2 is mesh-shaped. The light-shielding layer 12 provides a projection in a direction perpendicular to a top surface of the base substrate 10 to cover the photoconductive material layer 2. Thus, the light emitted from the light source module in the photosensitive display device may not pass through the light-shielding layer to illuminate the photoconductive material layer 2. The light source module does not affect the light sensing of the photosensitive structure. At this point, the light beam 5 may illuminate the photoconductive material layer 2 from a side of the base substrate 10 that is not covered by the light-shielding layer 12.

The present disclosure effectively integrates the photosensitive structure with the color filter substrate to realize an in-cell light touch control function. As such, the integrated photosensitive display device is thin and lightweight.

The present disclosure also provides a method of fabricating the photosensitive display substrate as shown in FIG. 5.

Figure 7:
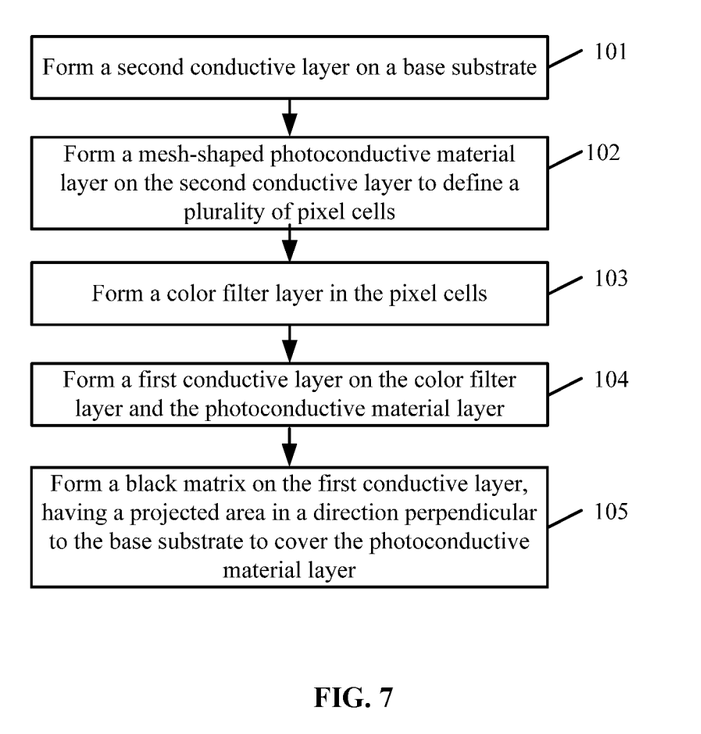
FIG. 7 illustrates a flow chart of an exemplary method for fabricating an exemplary photosensitive display substrate according to the second exemplary embodiment of the present disclosure.

FIG. 7 illustrates a flow chart of an exemplary method for fabricating an exemplary photosensitive display substrate according to the second exemplary embodiment of the present disclosure. The method includes the following steps.

Step 101: a second conductive layer is formed on a base substrate.

Figure 8A:
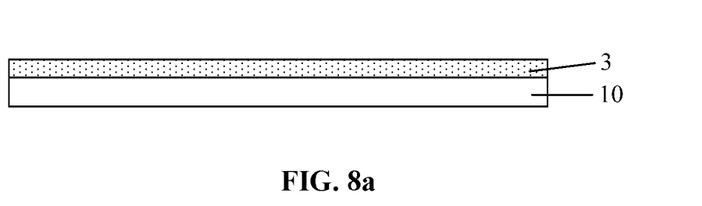
FIGS. 8a-8d illustrate structures of an photosensitive structure corresponding to certain stages of a fabrication process according to the second exemplary embodiment of the present disclosure.

FIG. 8a illustrates a schematic view of a photosensitive display substrate after forming a second conductive layer on a base substrate. As shown in FIG. 8a, a vapor deposition process may be used to form a second conductive layer 3 on a base substrate 10. Optionally, the second conductive layer 3 may be made of ITO.

Step 102: a photoconductive material layer is formed on the second conductive layer. The photoconductive material layer is mesh-shaped. The mesh-shaped photoconductive material layer defines a plurality of pixel cells, with each pixel cell being a mesh (e.g., a grid) enclosed by adjacent photoconductive material lines.

Figure 8B:
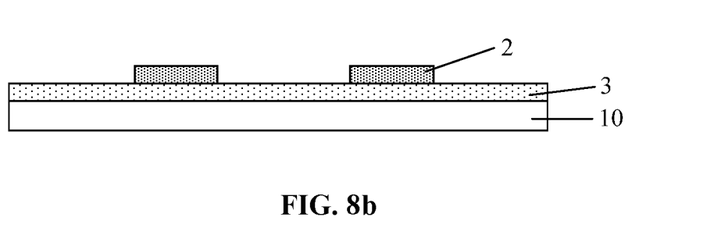

FIG. 8b illustrates a schematic view of the photosensitive display substrate after forming a photoconductive material layer on the second conductive layer. As shown in FIG. 8b, a coating or a vapor deposition process may be used to form a photoconductive material film on the second conductive layer 3. Then a patterning process may be applied to the photoconductive material film to form a first plurality of photoconductive material lines and a second plurality of photoconductive material lines crossly configured to form meshes to thus form the photoconductive material layer 2. The photoconductive material layer 2 is thus mesh-shaped. The mesh-shaped photoconductive material layer 2 defines a plurality of pixel cells 13.

The patterning process may include one or more steps selecting from: forming a material film (such as the photoconductive material film), coating a photoresist layer, exposing the photoresist layer, developing the exposed photoresist layer, etching the material film, and removing the unexposed photoresist layer. In one embodiment, the color filter layer may be used as the photoresist layer. In this case, the color filter layer may include combined functions of a color filter layer and a photoresist layer. For example, the color filter layer may be a photoresist layer containing desired color(s) or dye(s). Thus, the step of coating a photoresist layer may be skipped.

Step 103: a color filter layer is formed in the pixel cells defined by meshes in the photoconductive material layer 2.

Figure 8C:
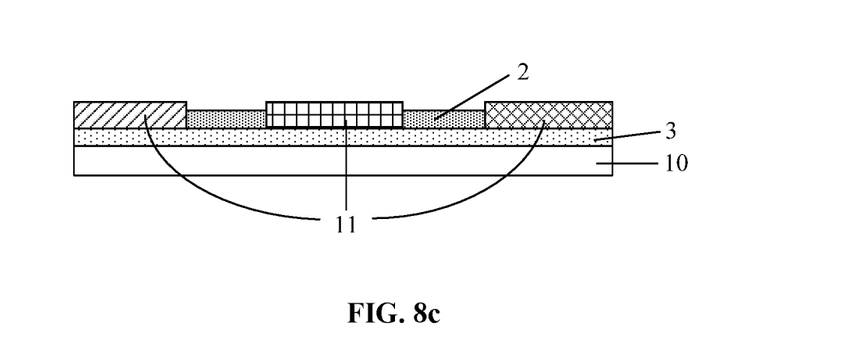

FIG. 8c illustrates a schematic view of the photosensitive display substrate after forming a color filter layer in the pixel cells. As shown in FIG. 8c, an inkjet printing or an evaporation process may be used to form a color matrix pattern in the pixel cells 13. The color matrix pattern may be used as the color filter layer 11. In one embodiment, the color filter layer 11 may have a top surface higher than a top surface of the photoconductive material layer 2.

Step 104: a first conductive layer is formed on the color filter layer and on the photoconductive material layer.

Figure 8D:
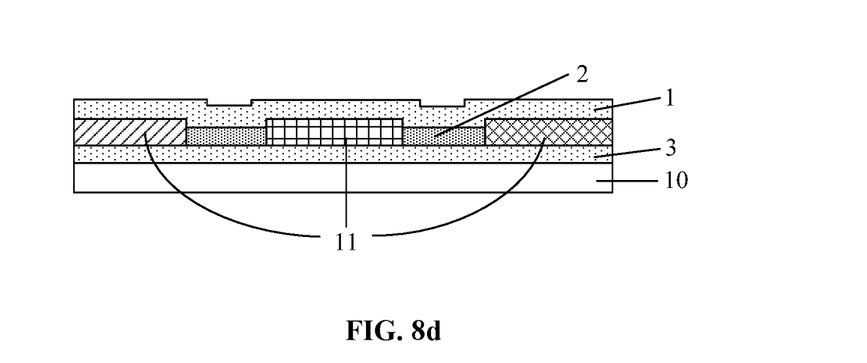

FIG. 8d illustrates a schematic view of the photosensitive display substrate after forming a first conductive layer on the color filter layer and on the photoconductive material layer. As shown in FIG. 8d, a vapor deposition process may be used to form a first conductive layer 1 on the color filter layer 11 and on the photoconductive material layer 2. Optionally, the first conductive layer 1 may be made of ITO. In one embodiment, the first conductive layer 1 is conformally formed on an entire surface of the structure in FIG. 8d, e.g., on the color filter layer 11 and on the photoconductive material layer 2.

Step 105: a light-shielding layer is formed on the first conductive layer associated with the photoconductive materials of the photoconductive material layer 2. For example, the light-shielding layer has a projection in a direction perpendicular to a top surface of the base substrate to cover the photoconductive material layer.

Referring back to FIG. 5, to form the light-shielding layer, a coating or a vapor deposition process may be used to form a layer of light-blocking material on the first conductive layer 1. Then, a patterning process may be applied to the light-blocking material layer to form the light-shielding layer 12. The light-shielding layer 12 is also mesh-shaped, corresponding to the exemplary mesh-shaped photoconductive material layer 2. The mesh-shaped light-shielding layer has a projection in a direction perpendicular to a top surface of the base substrate to cover the photoconductive material layer 2. The light-shielding layer blocks the light produced by the light source module in the photosensitive display device to prevent light leakage or light reflection from mistakenly triggering the light touch control during the display process.

Figure 9:
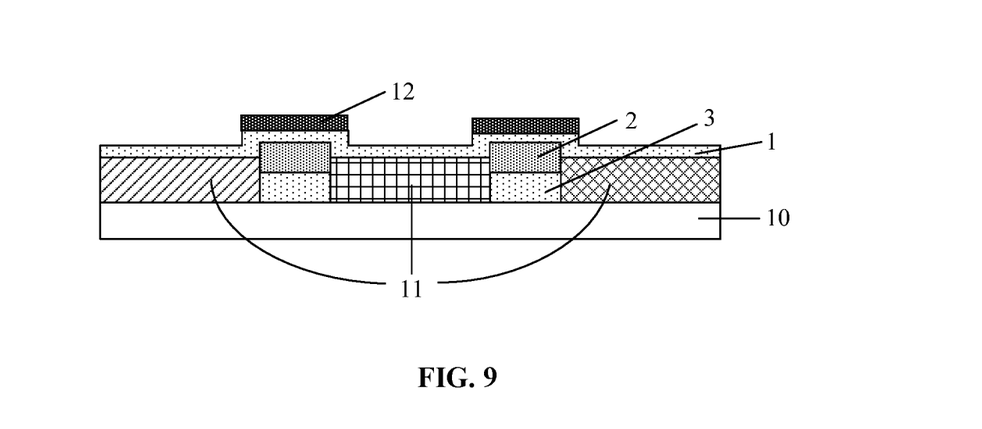
FIG. 9 illustrates a cross-sectional view of another exemplary photosensitive display substrate according to the second exemplary embodiment of the present disclosure.

FIG. 9 illustrates a schematic view of another exemplary photosensitive display substrate according to the second exemplary embodiment of the present disclosure.

As shown in FIG. 9, the difference between the photosensitive display substrates in FIG. 5 and FIG. 9 is that the second conductive layer 3 is mesh-shaped. The second conductive layer 3 has a projection in a direction perpendicular to a top surface of the base substrate to overlap with the projection of the photoconductive material layer 2 in a same direction. At this time, the second conductive layer 3 and the photoconductive material layer 2 may be formed by using a same patterning process. As such, the fabrication process does not need extra step and the light transmittance is improved. For example, the formed color filter layer may then have a top surface lower than a top surface of the photoconductive material layer 2 as shown in FIG. 9.

In some embodiments, the disclosed photosensitive structure may be configured on a different (e.g., opposite) side of the base substrate 10 that does not include the color filter layer 11 or the light-shielding layer 12.

The second exemplary embodiment of the present disclosure provides a photosensitive display substrate and a method of fabricating the photosensitive display substrate. The photosensitive display substrate includes a photosensitive structure and a display substrate. The display substrate includes a base substrate, a color filter layer and a light-shielding layer. The second conductive layer of the photosensitive structure is formed on the base substrate. The photoconductive material layer of the photosensitive structure is formed on the second conductive layer. The photoconductive material layer is mesh-shaped. The mesh-shaped photoconductive material layer defines a plurality of pixel cells. The color filter layer is formed in the pixel cells. The first conductive layer of the photosensitive structure is formed on the color filter layer and on the photoconductive material layer. The light-shielding layer is formed on the first conductive layer. The light-shielding layer has a projection in a direction perpendicular to a top surface of the base substrate to cover the photoconductive material layer. The present disclosure effectively integrates the photosensitive structure with a color filter substrate. The resulting photosensitive display device is thin and light weight.

Third Exemplary Embodiment

The third exemplary embodiment provides a photosensitive display device. The photosensitive display device includes a photosensitive display substrate. The photosensitive display substrate includes a photosensitive structure.

The photosensitive display device not only has the display function but also has the light touch control function. From a distance, a user may point a light beam with sufficient brightness to the photosensitive display device to remotely perform the light touch control function. As such, conventionally-used touch control object may not be used to physically contact on the light touch control screen. Surface wear and tear of the light touch control screen may be avoided. In addition, the light touch control function (instead of object touch control) is useful in the cases that the display screen is too large or difficult to reach, e.g., by hand.

Various embodiments also include a light touch control method used in a photosensitive display device. In this method, a photosensitive structure may include a first conductive layer, a second conductive layer, and a photoconductive material layer sandwiched by the first conductive layer and the second conductive layer. A plurality of first constant voltage sources may be configured in the periphery of the first conductive layer to supply power to charge the first conductive layer in a plurality of different directions to maintain a non-zero constant voltage as a first voltage on the first conductive layer. A light illumination may be received, passing through one of the first and second conductive layers to have a light illuminated area on the photoconductive material layer. A charging current between the first conductive layer and each of a plurality of first constant voltage sources may be measured by a plurality of current measurement units in response to the light illumination, to output a plurality of current signals corresponding to the plurality of first constant voltage sources. A touch position may be determined by a touch signal determination unit connected to the plurality of current measurement units, based on the plurality of current signals.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A photosensitive structure, comprising:
   a first conductive layer;
   a second conductive layer;
   a photoconductive material layer, sandwiched between the first conductive layer and the second conductive layer, wherein:
   in response to a light illumination, the photoconductive material layer is capable of changing from an insulating state to a conductive state, and
   the photoconductive material layer includes meshes formed by a first plurality of photoconductive material lines and a second plurality of photoconductive material lines that are crossly configured, each mesh corresponding to a pixel cell;
   one or more first constant voltage sources, configured in a periphery of the first conductive layer to charge the first conductive layer in a plurality of different directions to maintain a first voltage on the first conductive layer;
   a plurality of current measurement units, each disposed between the first constant voltage source and the first conductive layer and each configured to measure a charging current between the first constant voltage source and the first conductive layer, wherein the plurality of current measurement units are configured to output a plurality of current signals corresponding to the one or more first constant voltage sources; and
   a touch signal determination unit, connected to the plurality of current measurement units to determine a touch position based on the plurality of current signals from the plurality of current measurement units,
   wherein the second conductive layer includes meshes corresponding to the meshes in the photoconductive material layer.

2. The photosensitive structure of claim 1, wherein the one or more first constant voltage sources are connected to the first conductive layer at different locations of the first conductive layer to supply voltage to the first conductive layer via the different locations.

3. The photosensitive structure of claim 2, wherein:
   the first conductive layer has a polygonal shape, and the different locations of the first conductive layer include different sides and vertexes of the first conductive layer.

4. The photosensitive structure of claim 2, wherein:
   the first conductive layer has a circular shape, and the different locations of the first conductive layer include different location points that are symmetrically-configured or evenly-distributed on the first conductive layer.

5. The photosensitive structure of claim 1, wherein the first conductive layer comprises a rectangular conductive layer.

6. The photosensitive structure of claim 5, wherein the one or more first constant voltage sources are configured to apply a same voltage to four corners of the rectangular conductive layer.

7. The photosensitive structure of claim 5, wherein at least three first constant voltage sources are configured to apply a voltage to four corners of the rectangular conductive layer.

8. The photosensitive structure of claim 5, wherein the plurality of the current measurement units includes four current measurement units, each connected to one of four corners of the rectangular conductive layer.

9. The photosensitive structure of claim 1, wherein one first constant voltage source is configured and connected to the plurality of current measurement units.

10. The photosensitive structure of claim 1, wherein the photoconductive material layer is sheet-shaped or mesh-shaped.

11. The photosensitive structure of claim 1, wherein, when the first conductive layer has a rectangular shape with four corners A, B, C and D connected to four current measurement units to respectively measure the charging current at each corner denoted as i_A, i_B, i_C and i_D, the touch position of a touch point on the first conductive layer is determined by:

$$\frac{L1}{L2} \text{ and } \frac{L3}{L4},$$

wherein:

$$\frac{L1}{L2} = \frac{i\_A}{i\_D} = \frac{i\_B}{i\_C},$$

$$\frac{L3}{L4} = \frac{i\_D}{i\_C} = \frac{i\_A}{i\_B},$$

L1 is a distance between corner A or B and the touch point in a length direction of the rectangular shape,
L2 is a distance between corner C or D and the touch point in a length direction of the rectangular shape,
L3 is a distance between corner A or D and the touch point in a width direction of the rectangular shape, and
L4 is a distance between corner B or C and the touch point in a width direction of the rectangular shape.

12. The photosensitive structure of claim 1, wherein at least one of the first conductive layer and the second conductive layer is made of a transparent conductive material, the transparent conductive material including indium tin oxide (ITO).

13. The photosensitive structure of claim 1, wherein:
the photoconductive material layer is made of one or more of an inorganic material and an organic material,
the inorganic material includes selenium, selenium tellurium alloy, cadmium sulfide, zinc oxide, or a combination thereof, and
the organic material includes polyvinyl carbazole, phthalocyanine complex, azo compound, squire morpholine compound, or a combination thereof.

14. The photosensitive structure of claim 1, further including:
a plurality of second constant voltage sources, connected to the second conductive layer to provide a second voltage different from the first voltage.

15. A photosensitive display substrate, comprising:
the photosensitive structure according to claim 1, and
a display substrate, including a base substrate, a color filter layer, and a light-shielding layer, wherein:
the photosensitive structure, the color filter layer, and the light-shielding layer, are disposed over a same side of the base substrate,
the second conductive layer is formed over the base substrate,
the photoconductive material layer is formed over the second conductive layer,
the color filter layer is formed in the pixel cells,
the first conductive layer is formed over the color filter layer and over the photoconductive material layer, and
the light-shielding layer is formed over the first conductive layer and configured to provide a projected area covering the first and second plurality of photoconductive material lines of the photoconductive material layer in a direction perpendicular to a surface of the base substrate.

16. The photosensitive display substrate of claim 15, wherein the light-shielding layer includes meshes corresponding to the meshes in the photoconductive material layer.

17. A method of fabricating a photosensitive display substrate, comprising:
forming a first conductive layer over a base substrate;
forming a photoconductive material layer over the first conductive layer, the photoconductive material layer including meshes formed by a first plurality of photoconductive material lines and a second plurality of photoconductive material lines that are crossly configured, each mesh corresponding to a pixel cell;
forming a color filter layer in the pixel cells;
forming a second conductive layer over the color filter layer and over the photoconductive material layer, the second conductive layer including meshes corresponding to the meshes in the photoconductive material layer; and
forming a light-shielding layer over the second conductive layer to provide a projected area covering the first and second plurality of photoconductive material lines of the photoconductive material layer in a direction perpendicular to a surface of the base substrate.

18. A control method in a photosensitive display device, the method comprising:
providing the photosensitive structure including a first conductive layer having a rectangular shape with four corners A, B, C, and D, a second conductive layer, and a photoconductive material layer sandwiched by the first conductive layer and the second conductive layer;
supplying power, by one or more first constant voltage sources configured in the periphery of the first conductive layer, to charge the first conductive layer in a plurality of different directions to maintain a first voltage on the first conductive layer;
receiving a light illumination passing through one of the first and second conductive layers to have a light illuminated area in the photoconductive material layer;
measuring a charging current between the first conductive layer and each of the one or more first constant voltage sources in response to the light illumination, by a plurality of current measurement units connected to the four corners A, B, C, and D, to output a plurality of current signals denoted as i_A, i_B, i_C, and i_D corresponding to the one or more first constant voltage sources; and
determining a touch position, by a touch signal determination unit connected to the plurality of current measurement units, based over the plurality of current signals, the touch position being determined by $$\frac{L1}{L2} \text{ and } \frac{L3}{L4},$$

wherein:

$$\frac{L1}{L2} = \frac{i\_A}{i\_D} = \frac{i\_B}{i\_C},$$

$$\frac{L3}{L4} = \frac{i\_D}{i\_C} = \frac{i\_A}{i\_B},$$

L1 is a distance between corner A or B and the touch point in a length direction of the rectangular shape,
L2 is a distance between corner C or D and the touch point in a length direction of the rectangular shape,
L3 is a distance between corner A or D and the touch point in a width direction of the rectangular shape, and
L4 is a distance between corner B or C and the touch point in a width direction of the rectangular shape.

19. The method of claim 18, further including:
applying a second voltage to the second conductive layer by a plurality of second constant voltage sources, the second voltage being different than the first voltage, or connecting the second conductive layer to ground.

* * * * *